(No Model.)
J. P. WOOD.
CORN CUTTING KNIFE.
No. 409,723.          Patented Aug. 27, 1889.
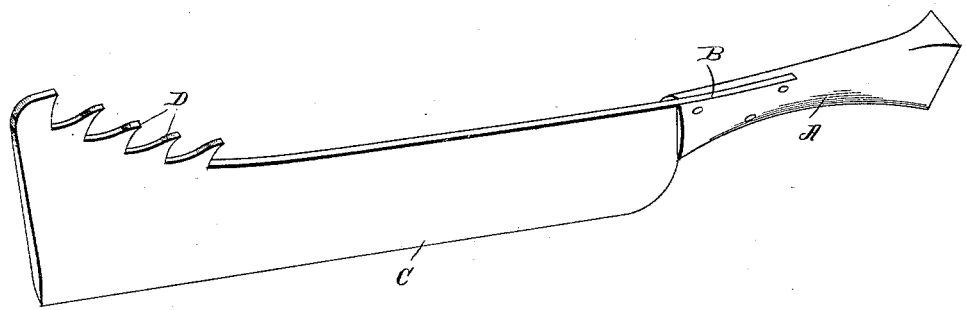

UNITED STATES PATENT OFFICE.

JAMES P. WOOD, OF FARIBAULT, MINNESOTA.

CORN-CUTTING KNIFE.

SPECIFICATION forming part of Letters Patent No. 409,723, dated August 27, 1889.

Application filed April 29, 1889. Serial No. 309,004. (No model.)

To all whom it may concern:

Be it known that I, JAMES P. WOOD, a citizen of the United States, residing at Faribault, in the county of Rice and State of Minnesota, have invented a new and useful Corn-Cutting Knife, of which the following is a specification.

My invention relates to improvements in corn-cutting knives; and it consists in certain novel features hereinafter described and claimed.

In the accompanying drawing I have shown a perspective view of a knife constructed in accordance with my invention.

The handle A of my improved device is constructed of wood or any other suitable light material, and has its lower edge made concave from end to end and convex in cross-section, so that it will fit the hand when in use. The handle is further provided with a slotted or bifurcated end, and the end of the blade B is secured therein. The blade has a straight sharp-cutting edge C, and its back is curved outward toward its free end and has a series of teeth D formed thereon, the said teeth projecting beyond the line of the back edge of the knife.

In practice the operator grasps the handle of the knife, and by giving the corn a sharp blow with the cutting-edge of the blade severs it from the stalk. In the event of the stalk being blown over, the teeth or hooks D are made to engage the stalk, so that it can be lifted into a convenient position for the gathering of the corn. Should one of the teeth fail to engage the stalk, the curved formation of the back of the blade throws the remaining teeth outward, so that one of the succeeding teeth will engage the stalk. The lifting of the stalk is thus insured without requiring any especial care or skill on the part of the operator. This construction is further advantageous for the reason that if one of the teeth be broken the efficiency of the knife is not destroyed, as the remaining teeth still render it serviceable.

From the foregoing description it will be seen that I have provided a very simple and efficient knife, by which the corn can be easily and effectually gathered without the necessity of the operator frequently stooping, and consequently soon becoming wearied.

Having thus described my invention, what I claim, and desire to secure by Letters Patent, is—

The improved corn-cutting knife having the back edge of its blade curved outward toward its free end and provided with a series of teeth on said curved portion, the said teeth projecting from and beyond the back edge of the blade, as specified.

In testimony that I claim the foregoing as my own I have hereto affixed my signature in presence of two witnesses.

JAMES P. WOOD.

Witnesses:
F. W. FRINK,
JAMES HUNTER.